United States Patent Office 3,217,861
Patented Nov. 16, 1965

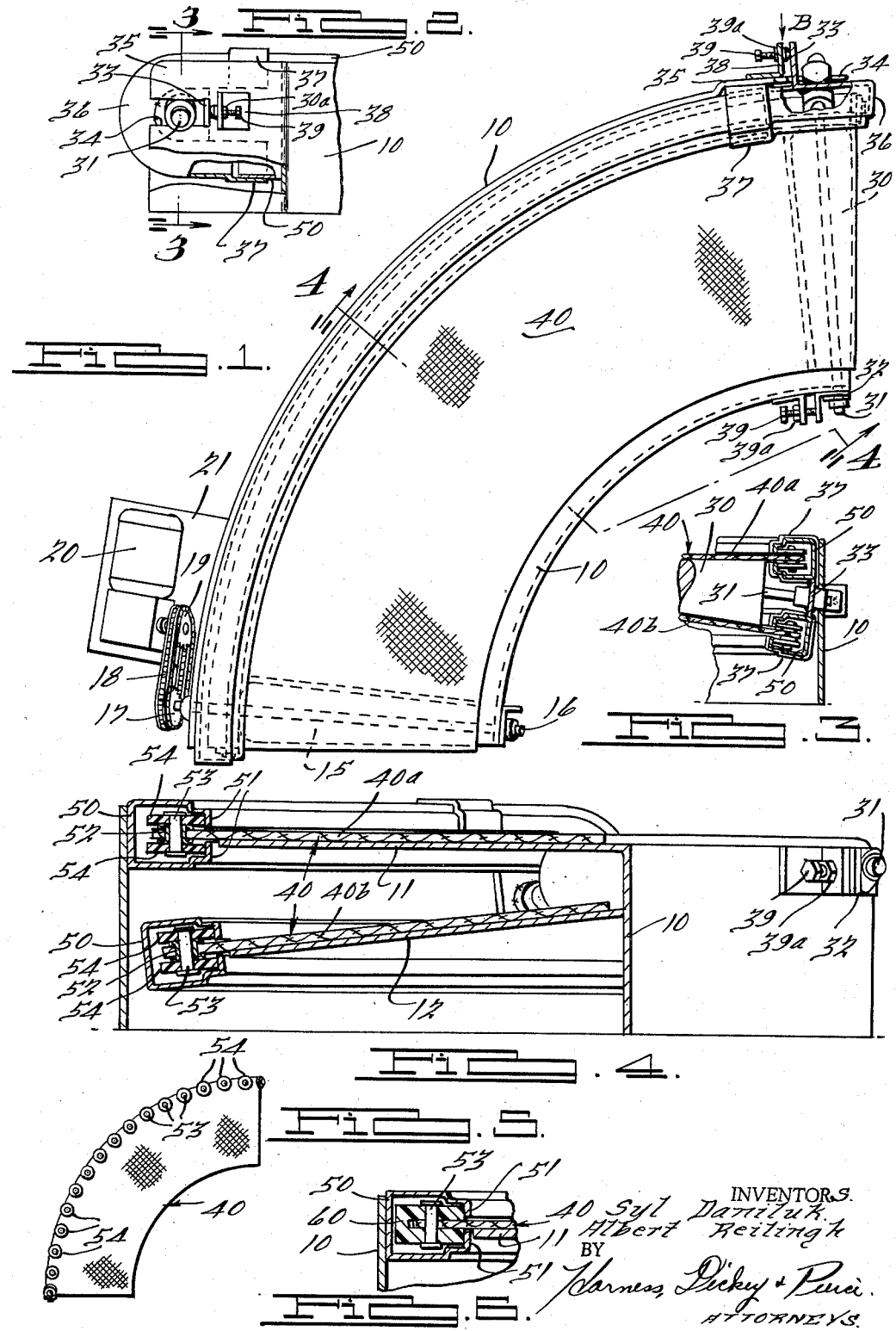

3,217,861
ENDLESS BELT CONVEYORS
Syl Daniluk and Albert Reilingh, Windsor, Ontario, Canada, assignors to McInnis Conveyors Limited, a company of Canada
Filed Feb. 14, 1963, Ser. No. 258,546
4 Claims. (Cl. 198—182)

This invention relates to endless belt conveyors and especially to an endless belt conveyor unit designed to move along a curved path to thereby change the direction of movement of articles carried thereby.

A primary object of the invention to to provide a conveyor belt turn having novel means for suspending the conveyor belt to permit its movement along a curved path and about guide rollers without lateral shitfing of the belt on its rollers or from its guides to thereby preent warping, buckling or creasing of the carrying surface of the belt.

Another object of the invention is to provide a conveyor belt turn wherein the passes of the conveyor belt are supported in a novel and expeditious manner whereby wear of the conveyor belt and of the supporting parts in minimized.

The various objects and advantages and the novel details of construction of two commercially practical embodiments of the invention will become more apparent as this description proceeds, especially when considered in connection with the accompanying drawings, in which:

FIGURE 1 is a plan view of a conveyor belt turn constructed in accordance with this invention;

FIGURE 2 is a fragmentary elevational view looking in the direction of arrow B in FIGURE 1;

FIGURE 3 is a sectional view taken substantially on the plane indicated by line 3—3 in FIGURE 2;

FIGURE 4 is a transverse sectional elevational view taken substantially on the plane indicated by line 4—4 in FIGURE 1;

FIGURE 5 is a view, on a reduced scale, of the belt removed from its supports; and FIG. 6 is a detail sectional view showing a modified form of construction.

This invention comprises essentially a conveyor belt turn of simple design using conventional type belt material cut in a frusto-conical shape. This belt is carried by suitable frusto-conical rolls or pulleys mounted in a suitable frame member. Means are provided to hold the top surface of the belt in a flat horizontal position during its movement about the rolls or pulleys and to resist any lateral shifting movement of the belt during its movement which might cause it to wrinkle or buckle. While the invention will be illustrated and described in connection with a belt arranged in an arc of substantially 90°, it will be readily understood by those skilled in this art that this arc may be of more or less than 90°, as desired.

As shown in FIGURE 4, the device comprises a frame 10 which, as shown in FIGURE 1, is arc-shaped in plan view. The frame is provided with a horizontal support 11 extending through its length adapted to support the upper flight of the belt and with an inclined support 12 extending through its length adapted to support the lower flight of the belt.

The belt, as shown separately in FIGURE 5, is arc shaped in its flattened condition and is preferably formed as the frustrum of a hollow cone. The belt may be made of any nonstretchable material, such as ordinary belting which has several layers of webbing laminated together as for instance by vulcanized rubber, or it may be made of steel belting, wire mesh, or the like.

Arranged at one end of the frame 10 is a drive roll or pulley 15 which is of substantially frusto-conical shape. This roll or pulley 15 constitutes the driving means for the belt and its shaft 16 is provided with a drive gear or sprocket 17 engaged by a chain 18 which also passes over a drive gear or sprocket 19 driven in any suitable manner as for instance by means of an electric motor 20. The motor 20 may be conveniently supported on a platform 21 extending laterally from the frame 10.

The other roll or pulley 30 is the same shape as the roll 15 and is provided with a shaft 31 mounted in a bracket 32 at one end and in a bracket 33 at its other end.

As shown in FIGURES 3 and 4, the upper edge of each frusto-conical roll 15 and 30 is arranged in a horizontal plane to hold the upper flight of the belt in a horizontal plane and the axes of these rolls are inclined with respect to one another to define the ends of the arc through which the belt travels, as illustrated in FIGURE 1.

The belt 40, when disposed on the rolls or pulleys 15 and 30 has its upper flight 40a resting on the horizontal support 11 and its lower flight 40b resting on the inclined lower support 12.

As illustrated in FIGURE 1, the drive roll 15 is fixed; whereas, the idler roll 30 is adjustable so as to be able to tighten the belt 40. For this purpose, the brackets 32 and 33 are both preferably adjustable, although only the bracket 33 actually need be adjusted. For this purpose, the bracket 33 is slidably mounted in a slot 34 formed in an offset portion 35 of the frame 10, the bracket 33 extending laterally through the slot 34, as illustrated at the upper right-hand corner of FIGURE 1 and in FIGURE 2. The bracket 33 may be secured to or form a part of a U-shaped track section 36 adapted to connect the adjacent ends of the tracks, yet to be described. The free ends of this U-shaped track section 36 are provided with enlarged portions 37 telescopically engaging the adjacent ends of the track sections so as to be slidable thereon. Secured to the enlarged portion 35 of the frame 10 is a bracket 38 carrying an adjusting screw 39 provided with a lock nut 39a. The end of the adjusting screw 39 engages the bracket 33 and by properly adjusting the adjusting screw 39, it will engage the bracket 33 and urge the U-shaped track section 36 to the right, as viewed in FIGURE 1, and to the left, as viewed in FIGURE 2, to thus move the roll or pulley 30 in the direction to tighten the belt 40.

As previously mentioned, it is an important object of this invention to provide means disposed adjacent the outer peripheral edge of the belt for forming a fixed path paralleling the edge of the belt and to connect the belt thereto to resist lateral shifting movement of the belt when it moves about its sector-shaped path. To this end, the device comprises a pair of track members 50 located adjacent the outer peripheral edge of the belt, each track member being substantially channel-shaped in cross section and terminating at its open side with laterally extending flanges 51 forming tracks. The adjacent edge of the belt 40 is provided with a plurality of apertures into each of which is inserted a grommet 52 which forms a bearing for a shaft or axle 53 on the ends of which are rotatably mounted wheel-like elements or rollers 54. As shown best in FIGURE 4, the edge of the belt extends into the space between the track flanges 51, and the wheel-like elements 54 roll on the inside of the channel and on the track flanges 51. Thus, the track means forms a fixed path paralleling the edge of the belt and the wheel-like elements 54, by their engagement with the track flanges 51, resist lateral shifting movement of the belt as the belt moves about its sector-shaped path.

The track-like elements 50 may be supported in any suitable manner on the frame 10 so as to be disposed adjacent the outer peripheral edge of the belt during its movement. The rollers or wheel-like elements 54 may be made of metal, or of such material as nylon, Teflon, or the like. The surface of the supports 11 and 12 may be of polished metal, or may be otherwise treated to have a low-friction characteristic, to prevent sticking of the belt thereon. The driving pulley 15 may be and preferably is roughened or provided with any suitable means to increase the friction between it and the belt so that the belt 40 may be positively driven.

In FIGURE 6, a slightly modified form of construction is illustrated wherein in place of the wheel-like elements 54, nonrotatable antifriction elements 60 are employed. These elements may be in the form of plastic blocks formed of nylon, Teflon, or other suitable antifriction material, and they ride on the track flanges 51, as described in connection with the preferred embodiment of the invention.

From the foregoing, it will be apparent that there is provided simple but effective means adapted to hold the top surface of the belt in a flat horizontal position and to resist lateral shifting movement of the belt on the frusto-conical rollers as the belt moves about its sector-shaped path. The tracks and wheel-like elements provide means for positively accomplishing this purpose while permitting the substantially frictionless movement of the belt. Thus, there is provided a structure which effectively accomplishes the purposes of the invention but which approaches the ultimate in structural simplicity and thus may be manufactured, assembled and maintained at a very nominal cost.

While two commercially practical embodiments of the invention have been described and illustrated herein somewhat in detail, it will be understood that various changes may be made as may come within the purview of the accompanying claims.

What is claimed is:

1. In a device of the class described, a curved endless belt adapted to form an arcuate sector when in flattened position with a large outer and small inner edge, a pair of frusto-conical rolls mounted within the belt at spaced angular end positions to stretch the belt about an arcuate sector with the top surface of the belt forming a curved conveyor path, track means disposed adjacent the outer peripheral edge of the belt and forming a fixed path paralleling the outer edge of the belt; and a plurality of pairs of rotatable elements, shafts extending through said belt inwardly of but adjacent to the large outer edge thereof, and means for securing a pair of rotatable elements on each shaft so as to have one element on each side of the belt, said elements traveling on the outer surface of said track means to resist inner shifting movement of the belt as the belt moves about its sector shaped path.

2. In a device as recited in claim 1 wherein means are provided for mounting one of said rolls in said track means, and means for adjusting the length of said track means to adjust said one roll to tighten said belt.

3. In a device of the class described, a curved endless belt having a large outer and small inner edge adapted to form an arcuate sector when in flattened position, a pair of frusto-conical rolls mounted within the belt at spaced angular end positions to stretch the belt about an arcuate sector with the top surface of the belt forming a curved conveyor path, a track located adjacent the outer peripheral edge of the belt and forming a fixed path paralleling the edge of the belt, said track comprising a channel-shaped member having laterally extending flanges at its open side, and a plurality of wheel-like elements connected to the belt on shafts disposed therethrough inwardly of but adjacent to the large outer edge of said belt with the elements disposed on opposite sides thereof and adapted to travel in said track while engaging said flanges to resist lateral shifting movement of the belt as the belt moves about its sector-shaped path.

4. In a device of the class described, a curved endless belt adapted to form an arcuate sector when in flattened position, a pair of frusto-conical rolls mounted within the belt at spaced angular end positions to stretch the belt about an arcuate sector with the top surface of the belt forming a curved conveyor path, a track located adjacent the outer peripheral edge of the belt and forming a fixed path paralleling the edge of the belt, said track comprising a channel-shaped member having laterally extending flanges placed apart to form an open side which receives said belt, a plurality of wheels, grommets in the edge of said belt, and shaft means extending through said grommets for rotatably mounting said wheels on opposite sides of said belt to travel in said track with the wheels engaging said flanges to resist lateral shifting movement of the belt as the belt moves about its sector-shaped path.

References Cited by the Examiner

UNITED STATES PATENTS

| 2,234,537 | 3/1941 | Blackburn | 198—182 |
| 2,310,160 | 2/1943 | Cohen | 198—182 |
| 3,044,603 | 7/1962 | Fry | 198—182 |

FOREIGN PATENTS

| 228,729 | 10/1958 | Australia. |
| 1,275,721 | 10/1961 | France. |

SAMUEL F. COLEMAN, *Primary Examiner.*

ERNEST A. FALLER, WILLIAM B. LABORDE,
*Examiners.*